United States Patent [19]

Nakai

[11] Patent Number: 5,409,979
[45] Date of Patent: Apr. 25, 1995

[54] LIQUID-CRYSTAL POLYESTER RESIN COMPOSITION CONTAINING SPECIFIED MOLD RELEASE AGENTS

[75] Inventor: Mikio Nakai, Shizuoka, Japan

[73] Assignee: Polyplastics Co., Ltd., Osaka, Japan

[21] Appl. No.: 70,959

[22] Filed: Jun. 4, 1993

Related U.S. Application Data

[63] Continuation-in-part of Ser. No. 979,910, Nov. 23, 1992, abandoned, which is a continuation of Ser. No. 474,342, Feb. 2, 1990, abandoned.

[30] Foreign Application Priority Data

Feb. 8, 1989 [JP] Japan .................................. 1-29389

[51] Int. Cl.⁶ ........................................... C08F 265/04
[52] U.S. Cl. ..................... 524/306; 524/311; 524/315; 524/318; 524/454; 524/494; 524/496; 524/601; 524/605
[58] Field of Search ............... 524/306, 311, 315, 318, 524/605, 454, 494, 496; 525/601

[56] References Cited

U.S. PATENT DOCUMENTS

| | | | |
|---|---|---|---|
| 3,423,347 | 1/1969 | Zawadzki et al. | 523/174 |
| 4,126,593 | 11/1978 | Takahashi | 524/311 |
| 4,161,470 | 7/1979 | Calundann | 528/206 |
| 4,174,325 | 11/1979 | Pischtschan et al. | 524/287 |
| 4,299,756 | 11/1981 | Calundann | 524/599 |
| 4,371,660 | 2/1983 | Calundann et al. | 524/601 |
| 4,375,530 | 3/1983 | Hay et al. | 524/605 |
| 4,395,509 | 7/1983 | Blackwell et al. | 524/127 |
| 4,408,000 | 10/1983 | Lee | 524/315 |
| 4,409,351 | 10/1983 | Lee | 524/322 |
| 4,434,263 | 2/1984 | Blackwell | 524/322 |
| 4,438,236 | 3/1984 | Cogswell et al. | 525/165 |
| 4,481,324 | 11/1984 | Hall et al. | 524/312 |
| 4,487,874 | 12/1984 | Lindner | 524/311 |
| 4,530,953 | 6/1985 | Yoshida | 524/311 |
| 4,728,713 | 3/1988 | Hisgen et al. | 528/190 |
| 4,746,694 | 5/1988 | Charbonneau et al. | 524/602 |
| 4,877,823 | 10/1989 | Plachetta et al. | 524/80 |
| 4,943,606 | 7/1990 | Inoue et al. | 523/457 |
| 4,960,813 | 10/1990 | Wadhwa | 524/311 |

FOREIGN PATENT DOCUMENTS

| | | |
|---|---|---|
| 0066997 | 12/1982 | European Pat. Off. . |
| 0168503 | 1/1986 | European Pat. Off. . |
| 0175535 | 3/1986 | European Pat. Off. . |
| 0242987 | 10/1987 | European Pat. Off. . |
| 0292275 | 11/1988 | European Pat. Off. . |
| 3031491 | 4/1982 | Germany . |

*Primary Examiner*—Frederick Krass
*Attorney, Agent, or Firm*—Burns, Doane, Swecker & Mathis

[57] ABSTRACT

Liquid-crystal polyesters have been found to present special concerns when molded. The composition of the present invention has been found to provide unexpectedly superior processability results for such class of polymers. The improved liquid-crystal polyester resin composition comprises:

(a) 100 parts by weight of a liquid-crystal polyester resin, and (b) 0.01 to 5 parts by weight of a fatty acid ester represented by the general formula:

$$X^3CH_2-\underset{\underset{CH_2X^4}{|}}{\overset{\overset{CH_2X^2}{|}}{C}}-CH_2X^1 \quad (1)$$

wherein at least one of $X^1$, $X^2$, $X^3$ and $X^4$ is a $$-O-\overset{\overset{O}{\|}}{C}-R$$

group and the others are each —H, —OH, or an alkyl or aryl group, and R is an alkyl or alkenyl group having 2 to 30 carbon atoms. It surprisingly has been found through empirical research that good mold release is made possible in the liquid-crystal polyester resin composition of the present invention coupled with a good retention of mechanical properties (i.e., flexural strength and flexural modulus) in the resulting article. The liquid-crystal polyester composition was found to be highly stable and has been found to resist discoloration upon molding and to resist deleterious gas evolution when the resulting molded article is heated.

14 Claims, No Drawings

LIQUID-CRYSTAL POLYESTER RESIN COMPOSITION CONTAINING SPECIFIED MOLD RELEASE AGENTS

CROSS-REFERENCE TO RELATED APPLICATIONS

This is a continuation-in-part application of U.S. Ser. No. 07/979,910, filed Nov. 23, 1992, now abandoned which is a continuation of U.S. Ser. No. 07/474,342, filed Feb. 2, 1990 (now abandoned).

The present invention relates to a liquid-crystal polyester resin composition. More particularly, the present invention relates to an improved liquid-crystal polyester resin composition which was found through empirical research to exhibit superior overall processability during molding. The liquid-crystal polyester resin composition of the present invention has been found to be highly stable and has been found to resist discoloration upon molding and deleterious gas evolution when the molded article is heated. Good mold release is made possible coupled with a good retention of mechanical properties (i.e., flexural strength and flexural modulus).

BACKGROUND OF THE INVENTION

A thermoplastic resin to be used as a material for the preparation of an electrical or electronic component or a part of an automobile or chemical instrument has been recognized to require high heat resistance. A liquid-crystal polyester resin is one of the resins satisfying this requirement of high heat resistance and is frequently used in the preparation of precision molded articles, because it exhibits low shrinkage when the melt thereof is solidified and is excellent in fluidity. However, even such a liquid-crystal polyester resin is so poor in release characteristics from a mold having a complicated shape that the stable continuous molding thereof is difficult and requires a low molding rate (a long molding cycle), thus resulting in low productivity. That is, although a liquid-crystal polyester resin may be inherently superior in mold release characteristics when compared to other resins, the mold release characteristics thereof are not satisfactory as yet in such molding applications as described above.

Up to this time, addition of a parting agent to a resin has been employed as a means for improving the mold release characteristics of the resin. The following compounds have been known as such parting agents.

(1) addition of a metal salt of a fatty acid, such as zinc stearate or lithium stearate,
(2) addition of a fatty acid ester such as glycerol tristearate, and
(3) addition of a fatty acid amide such as N,N'-alkylenebisalkanamide.

Although the methods (1), (2) and (3) are effective in improving the mold release characteristics of a liquid-crystal polyester resin, they are all problematic in that the parting agent is decomposed to cause discoloration of a molded article, lowering in the mechanical properties thereof and/or gas evolution in kneading or molding, because the thermal decomposition temperature of the parting agent is lower than the molding temperature of a liquid-crystal polyester resin.

SUMMARY OF THE INVENTION

The inventors of the present invention have made studies upon various parting agents in order to obtain a liquid-crystal polyester resin composition which is improved in mold release characteristics and hardly decomposes thermally to cause neither discoloration of a molded article nor gas evolution in molding and which stains to a lesser extent the contact of an electrical component and has excellent mechanical properties and have found that the mold release characteristics of a liquid-crystal polyester resin are remarkably improved by the addition of an ester of a fatty acid with an aliphatic alcohol not having any hydrogen atoms bonded to the carbon atom at position $\beta$ to an alcoholic hydroxyl group, without lowering the mechanical properties of the resin, that the resulting composition is stable even at a molding temperature of the resin to cause neither decomposition nor gas evolution and that the resin is so excellent in compatibility with the ester by virtue of the ester linkages present in the skeleton of the resin that the ester added to the resin hardly bleeds out, thus hardly causing the staining of the contact. The present invention has been accomplished on the basis of these findings.

Namely, the present invention relates to a liquid-crystal polyester resin composition comprising:

(a) 100 parts by weight of a liquid-crystal polyester resin, and
(b) 0.01 to 5 parts by weight of a fatty acid ester represented by the general formula:

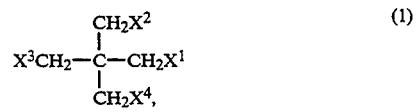

wherein at least one of $X^1$, $X^2$, $X^3$ and $X^4$ is a

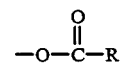

group and the others are each —H, —OH, an alkyl or an aryl group when not

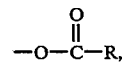

and R is an alkyl or alkenyl group having 2 to 30 carbon atoms.

Although the parting agent to be used as the component (b) in the present invention may be any fatty acid ester having a structure represented by the general formula (1), it is preferable to use an ester of a fatty acid with a polyhydric alcohol represented by the general formula (1) wherein all of $X^1$, $X^2$, $X^3$ and $X^4$ are groups represented by the general formula:

wherein R is an alkyl or alkenyl group having 2 to 30 carbon atoms, or wherein all of $X^1$, $X^2$ and $X^3$ are groups represented by the general formula (2) and $X^4$ is —OH, —H or an alkyl or aryl group. Although R in the general formula (2) may be any alkyl or alkenyl group having 2 to 30 carbon atoms, it is preferable that R be an alkyl group having 8 to 24 carbon atoms. The preferred aryl group is phenyl.

Representative examples of the compound represented by the general formula (1) include esters of higher fatty acids with neopentyl alcohol, neopentyl glycol or pentaerythritol, among which pentaerythritol tri- or tetrastearate and pentaerythritol tri- or tetraoleate are preferred, because they have been found to less stain the contact of an electrical component.

The amount of the fatty acid ester to be used in the present invention is 0.01 to 5 parts by weight, preferably 0.1 to 2 parts by weight, per 100 parts by weight of the liquid-crystal polyester resin. If the amount is less than 0.01 part by weight, commonly no appreciable benefit can be attained, while if it exceeds 5 parts by weight, the resulting composition may be unfavorably lowered in physical properties and may evolve a gas.

When a molded article made of a composition prepared by adding the fatty acid ester (b) according to the present invention to a general heat-resistant resin such as polyphenylene sulfide or polyether ether ketone and is exposed to a high temperature for a long period of time, it has been found that the fatty acid ester tends to bleed out and to stain the contact. Meanwhile, it has been found that a liquid-crystal polyester resin is well compatible with the fatty acid ester according to the present invention by virtue of the ester skeleton thereof, so that the fatty acid ester hardly bleeds out and accordingly does not stain the contact.

The liquid-crystal polyester to be used in the present invention is a melt-processable one having the characteristic wherein the molecular chains thereof inherently assume a regular parallel arrangement in a molten state. Such an ordered state of molecules is also called the "liquid-crystal state" or "nematic phase of a liquid-crystal substance". The molecule of a liquid-crystal polymer is generally slender and flat, exhibits a relatively high stiffness along the major axis of the molecule and has a plurality of chain-extending bonds which are present coaxially or in parallel.

The presence of an anisotropic molten phase can be ascertained by a conventional examination with polarized light using crossed nicols. More precisely, a molten sample when placed on a Leitz hot stage is observed in a nitrogen atmosphere by the use of a Leitz polarization microscope (40× magnification). When the polymer according to the present invention is subjected to the above test between crossed nicols, polarized light is transmitted through the nicols even when the polymer is in a static molten state, which indicates that the polymer is optically anisotropic.

The liquid-crystal polymer used in the present invention commonly is substantially insoluble in an ordinary solvent, so that the processing thereof in a dissolved state while in solution is not possible. As described above, however, it can be easily processed by a conventional melt processing method.

The components constituting an anisotropic molten phase-forming polymer are selected from among
(1) one or more of aromatic or alicyclic dicarboxylic acids,
(2) one or more of aromatic or alicyclic diols,
(3) one or more of aromatic hydroxy carboxylic acids,
(4) one or more of aromatic thiol carboxylic acids,
(5) one or more of aromatic thiol phenols, and
(6) one or more of aromatic hydroxy amines and aromatic diamines.

Namely, the anisotropic molten phase-forming polymer according to the present invention is a polymer composed of at least one segment selected from among
(I) polyesters mainly comprising the components (1) and (2),
(II) polyesters mainly comprising the component (3) alone,
(III) polyesters mainly comprising the components (1), (2) and (3),
(IV) polythiol esters mainly comprising the component (4) alone,
(V) polythiol esters mainly comprising the components (1) and (5),
(VI) polythiol esters mainly comprising the components (1), (4) and (5),
(VII) polyester amides mainly comprising the components (1), (3) and (6) and
(VIII) polyester amides mainly comprising the components (1), (2), (3) and (6).

These polymers each may include recurring units derived an aliphatic diol, so long as they exhibit liquid-crystal properties.

Further, the anisotropic molten phase-forming polymer according to the present invention may include polyester carbonates, though they do not fall into any of the above categories. The polyester carbonate may comprise as major components recurring 4-oxybenzoyl units, dioxyphenyl units, dioxycarbonyl units and terephthaloyl units.

The anisotropic molten phase-forming polymer that is particularly suited for use in the present invention is a polymer consisting essentially of aromatic polyesters (I), (II), or (III), or the aromatic polyester amides (VIII). Such polymer can be prepared by reacting organic monomers having functional groups which can form the corresponding repeating units according to various esterification methods.

Preferred examples of the monomers constituting the above polymers include naphthalene compounds such as 2,6-naphthalenedicarboxylic acid, 2,6-dihydroxynaphthalene, 1,4-dihydroxynaphthalene and 6-hydroxy-2-naphthoic acid; biphenyl compounds, such as 4,4'-diphenyldicarboxylic acid and 4,4'-dihydroxybiphenyl; compounds represented by the following general formulas (I), (II) and (III):

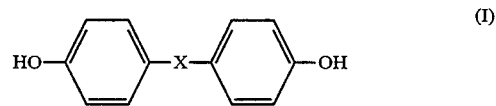

(I)

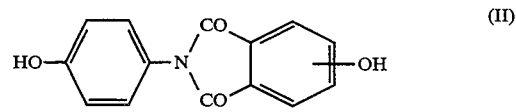

(II)

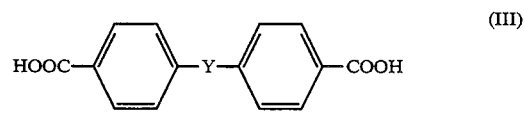

(III)

wherein X is a group selected from among alkylene ($C_{1-4}$), alkylidene, —O—, —SO—, —SO$_2$—, —S—, and —CO—, and Y is a group selected from among —(CH$_2$)$_n$— (where n=1 to 4) and —O(CH$_2$)$_n$O— (where n=1 to 4); p-substituted benzene compounds, such as p-hydroxybenzoic acid, terephthalic acid, hydroquinone, p-aminophenol and p-phenylene diamine; nucleus-substituted derivatives thereof (the substituent being selected from among chlorine, bromine, methyl, phenyl and 1-phenylethyl); and m-substituted benzene compounds, such as isophthalic acid and resorcinol.

In preferred embodiments the liquid-crystal polyester resin comprises recurring naphthalene units. A particularly preferred liquid-crystal polyester resin comprises recurring 4-oxybenzoyl moieties and recurring 6-oxy-2-naphthoyl moieties. See, for instance, liquid-crystal polyester resin "A" discussed hereafter wherein the 4-oxybenzoyl moieties are present in a concentration of approximately 70 mole percent and the 6-oxy-2-naphthoyl moieties are present in a concentration of approximately 30 mole percent.

The liquid-crystal polyester to be used in the present invention may partially contain a polyalkylene terephthalate segment not forming an anisotropic molten phase in addition to the above segment in the same molecular chain. The alkylene group may be one having 2 to 4 carbon atoms.

Among the above monomers, it is still preferable to use one or more compounds selected from among naphthalene compounds, biphenyl compounds and p-substituted benzene compounds as the constituents of the polymer. Among the p-substituted benzene compounds, it is particularly preferable to use p-hydroxybenzoic acid, methylhydroquinone, or 1-phenyl-ethylhydroquinone.

Particular examples of the compounds to be used in the preparation of the polymers (I) to (VIII) and preferable examples of the anisotropic molten phase-forming polyester to be used in the present invention are described in Japanese Patent Publication No. 69866/1986.

Further, the composition of the present invention may contain other thermoplastic resin as an auxiliary component in such an amount as not to hinder the object of the present invention.

The thermoplastic resin to be added as an auxiliary component is not particularly limited, but includes polyolefins such as polyethylene and polypropylene; aromatic polyesters prepared by the polycondensation of an aromatic dicarboxylic acid with a diol, such as polyethylene terephthalate and polybutylene terephthalate, or that of a hydroxy carboxylic acid; polyacetal (homo- and copolymers); polystyrene; polyvinyl chloride; polyamide; polycarbonate; ABS; polyphenylene oxide; polyphenylene sulfide and fluororesins. These thermoplastic resins may be also utilized in a mixture of two or more of them.

Further, the composition of the present invention may contain various fibrous, powdery, granular or flaky inorganic fillers depending upon the intended end use.

The fibrous filler includes inorganic fibrous materials, for example, glass fiber, milled glass fiber, asbestos fiber, silica fiber, silica/alumina fiber, alumina fiber, zirconia fiber, boron nitride fiber, silicon nitride fiber, boron fiber, potassium titanate fiber and fibers of metals, such as stainless steel, aluminum, titanium, copper or brass. Milled glass fibers are commercially available and consist of short glass fibers of varying lengths formed by the grinding of glass fibers with the retention of a fibrous configuration. The fibrous filler is preferably present in an amount of approximately 40 to 100 parts by weight per 100 parts by weight of the liquid-crystal polyester resin.

The powdery and granular fillers include carbon black, graphite, silica, quartz powder, glass beads, milled glass fiber, glass ballons, glass powder, silicates such as calcium silicate, aluminum silicate, kaolin, talc, clay, diatomaceous earth and wollastonite; metal oxides such as iron oxide, titanium oxide, zinc oxide, antimony trioxide and alumina; metal carbonates such as calcium carbonate and magnesium carbonate; metal sulfates such as calcium sulfate and barium sulfate; ferrite, silicon carbide, silicon nitride, boron nitride and various metal powders.

The flaky filler includes mica, glass flake and various metal foils.

These inorganic fillers may be used alone or as a mixture of two or more of them.

If necessary, these fillers may be each used together with a sizing agent or surface treatment. Examples thereof include functional compounds such as epoxy, isocyanate, silane and titanate compounds. These compounds may be each preliminarily applied to the filler to be added to the resin or may be added in the course of the preparation of the composition.

The amount of the inorganic filler to be added is at most 500 parts by weight, preferably 0.5 to 500 parts by weight, particularly preferably 5 to 250 parts by weight, per 100 parts by weight of the liquid-crystal polyester resin used. If the amount exceeds 500 parts by weight, the resulting composition commonly will be so poor in fluidity that it will be difficult to mold the composition particularly while using a mold having a complicated shape. Further, if the amount is too large, the resulting composition may tend to be brittle and to yield a molded article that is problematic in mechanical strengths.

Further, the composition of the present invention may suitably contain additives which are generally added to a thermoplastic or thermosetting resin depending upon the performance required. Examples of the additives include stabilizers, such as antioxidants and ultraviolet absorbers; antistatic agents; flame retardants; coloring agents such as dyes and pigments and lubricants.

The liquid-crystal polyester resin composition of the present invention can be prepared according to a conventional process for the preparation of a synthetic resin composition through the use of conventional equipment. Thus the composition can be prepared by mixing the necessary components with each other and kneading and pelletizing the obtained mixture with a single- or twin-screw extruder. Further, a part of the necessary components may be added as a master batch to the remainder thereof. Alternatively, in order to facilitate the dispersion and mixing of the components, a part or the whole of the liquid-crystal polyester resin may be pulverized and mixed with the other components, followed by melt-extrusion.

The liquid-crystal polyester resin composition of the present invention has the following advantages:

(1) the mold release resistance of the composition of the present invention is reduced to $\frac{1}{2}$ to $\frac{1}{4}$ of that of a liquid-crystal polyester not containing the fatty acid ester according to the present invention, so that the composition of the present invention can be stably injection-molded in a continuous manner without causing any deformation or breakage of a molded article due to poor mold release characteristics. Thus, the molding cycle of the composition is shortened to remarkably enhance the productivity, and (2) the parting agent according to the present invention is more stable thermally and chemically than those utilized with liquid-crystal polyesters according to the prior art in injection molding or kneading, so that the composition of the present invention containing the same is less discolored and does not evolve gas during its residence time in an injection molding machine. Therefore, the mold used is not corroded by the decomposition gas. Further, the composition stains to a lesser degree the contact of an electrical component and the mechanical properties of the composition are not adversely affected.

EXAMPLE

The present invention will now be described in more detail by referring to the following Examples, though the present invention is not limited to them.

The liquid-crystal polyesters used in the Examples have the following constituent units:

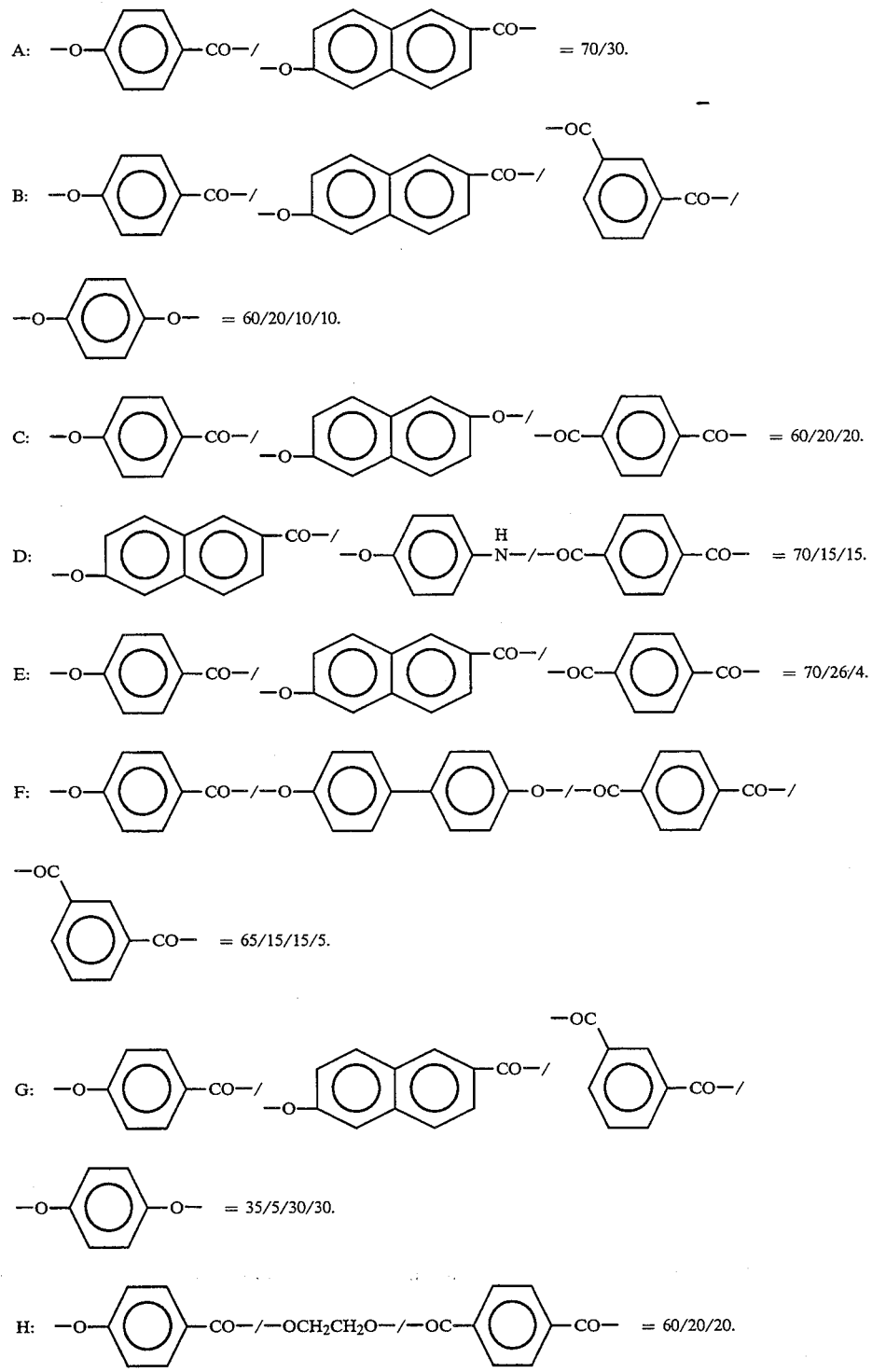

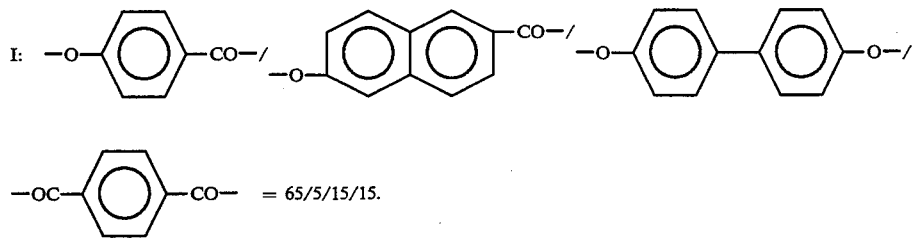

I: = 65/5/15/15.

(The preceding numbers express molar ratios.)

Examples 1 to 11

100 parts by weight of each of eight liquid-crystal polyester resins A to H which will be described below were mixed with 60 parts by weight of glass fiber, 40 parts by weight of milled glass fiber, and 0.5 part by weight of a stearate of pentaerythritol listed in Table 1. The resulting mixture was pelletized with a conventional extruder and the obtained pellet was molded with an injection molding machine at a cylinder temperature of 300° C. to form a test specimen in accordance with the ASTM procedure. This test specimen was examined for various characteristics.

The mold-release resistance was determined by carrying out the injection molding by the use of a box mold having an ejector pin fitted with a pressure sensor at a mold temperature of 120° C. to measure the pressure applied to the ejector pin for releasing a molded article from the mold. The gas evolution was determined by observing whether fumes were evolved from a nozzle present in the injection molding. The electrical resistance was determined by placing 22 grams of the above-identified pellets on the bottom of a test tube having an outside diameter of 30 mm. and a height of 150 mm., hanging a silver plate (2 mm.×12 mm.) with the use of a thread at a height of about 60 mm. above the top of the pellets, closing the test tube, placing the test tube in a fan dryer to treat it at 260° C. for one hour, taking the silver plate out of the test tube, and measuring the electrical resistance of the surface of the plate with a contact pressure of 10 grams by the use of a milliohm meter. A smaller electrical resistance value suggests a lesser stain. The results are shown in Table 1.

Examples 12 to 14

100 parts by weight of liquid-crystal polyester resin A were mixed with 45 parts by weight of potassium titanate fiber and pentaerythritol tetrastearate in an amount specified in Table 2. The obtained mixture was pelletized with the use of a conventional extruder. The obtained pellets were similarly treated and were examined for mold release and other characteristics. The results are shown in Table 2.

Examples 15 to 17

100 parts by weight of liquid-crystal polyester resin A were mixed with 45 parts by weight of glass fiber and pentaerythritol tristearate in an amount specified in Table 3. The obtained mixture was pelletized with the use of a conventional extruder. The obtained pellets were similarly treated and were examined for mold release and other characteristics. The results are shown in Table 3.

Comparative Examples 1 to 5

The same procedure as that described in Example 1 was repeated except that no pentaerythritol tetrastearate was used or that the pentaerythritol tetrastearate was replaced by a parting agent listed in Table 4 that was not in accordance with the present invention. The results are shown in Table 4.

Comparative Examples 6 and 7

The same procedure as that described in Example 13 was repeated except that no pentaerythritol tetrastearate was used or that the pentaerythritol tetrastearate was replaced by a parting agent listed in Table 5 that was not in accordance with the present invention. The results are shown in Table 5.

Comparative Examples 8 to 10

100 parts by weight of a heat-resistant resin listed in Table 6, 45 parts by weight of glass fiber and pentaerythritol tetrastearate in an amount specified in Table 6 were mixed together and pelletized with the use of a conventional extruder. The obtained pellets were similarly treated and were examined for mold release and other characteristics. The results are shown in Table 6.

Examples 18 to 26

100 parts by weight of liquid-crystal polyester resins A through I were mixed with 60 parts by weight of glass fiber, 40 parts by weight of milled glass fiber, and 0.5 part by weight of pentaerythritol tetramontanate as reported in Table 7. The pentaerythritol tetramontanate was formed by the reaction with pentaerythritol of montanic acid that consisted of a mixture of long-chain fatty acids having chain lengths of 24 to 30 carbon atoms derived from montan wax. The milled glass fiber was an article of commerce and consisted of short glass fibers of varying lengths formed by the grinding of glass fibers with the retention of a fibrous configuration. The results are reported in Table 7.

Examples 27 to 29

100 parts by weight of liquid-crystal polyester resin I were mixed with 45 parts by weight potassium titanate fiber and 0.5 to 2.0 parts by weight of pentaerythritol tetramontanate as reported in Table 8. The pentaerythritol tetramontanate was formed by the reaction with pentaerythritol of montanic acid that consisted of a mixture of long-chain fatty acids having chain lengths of 24 to 30 carbon atoms derived from montan wax. The results are reported in Table 8.

Examples 30 to 33

100 parts by weight of liquid-crystal polyester resin I were mixed with 45 parts by weight of glass fiber and 0.1 to 2.0 parts by weight of pentaerythritol tetramontanate (as previously described) or 0.2 part by weight of pentaerythritol tetrastearate as reported in Table 9.

Comparative Examples 12 to 15

100 parts by weight of liquid-crystal polyester resins A, B or I were mixed with 45 to 60 parts by weight of glass fiber, milled glass fiber or potassium titanate fiber, and no ester of a fatty acid as reported in Table 10. The inferior results also are reported in Table 10.

TABLE 1

|  | Ex. 1 | Ex. 2 | Ex. 3 | Ex. 4 | Ex. 5 | Ex. 6 |
|---|---|---|---|---|---|---|
| Composition (parts by weight) | A | B | B | B | B | C |
| liquid-crystal polyester resin | 100 | 100 | 100 | 100 | 100 | 100 |
| glass fiber | 60 | 60 | 60 | 60 | 60 | 60 |
| milled glass fiber | 40 | 40 | 40 | 40 | 40 | 40 |
| pentaerythritol monostearate |  | 0.5 |  |  |  |  |
| pentaerythritol distearate |  |  | 0.5 |  |  |  |
| pentaerythritol tristearate |  |  |  | 0.5 |  |  |
| pentaerythritol tetrastearate | 0.5 |  |  |  | 0.5 | 0.5 |
| Characteristics |  |  |  |  |  |  |
| flexural strength (kg./cm$^2$.) | 1901 | 1880 | 1882 | 1884 | 1884 | 1848 |
| flexural modulus (kg./cm$^2$.) | $15.7 \times 10^4$ | $15.6 \times 10^4$ | $15.5 \times 10^4$ | $15.6 \times 10^4$ | $15.6 \times 10^4$ | $15.1 \times 10^4$ |
| mold release resistance (kg.) | 243 | 251 | 250 | 248 | 248 | 248 |
| gas evolution in injection molding | none | none | none | none | none | none |
| electric resistance (mΩ) | 7 | 14 | 14 | 8 | 7 | 9 |

|  | Ex. 7 | Ex. 8 | Ex. 9 | Ex. 10 | Ex. 11 |
|---|---|---|---|---|---|
| Composition (parts by weight) | D | E | F | G | H |
| liquid-crystal polyester resin | 100 | 100 | 100 | 100 | 100 |
| glass fiber | 60 | 60 | 60 | 60 | 60 |
| milled glass fiber | 40 | 40 | 40 | 40 | 40 |
| pentaerythritol monostearate |  |  |  |  |  |
| pentaerythritol distearate |  |  |  |  |  |
| pentaerythritol tristearate |  |  |  |  |  |
| pentaerythritol tetrastearate | 0.5 | 0.5 | 0.5 | 0.5 | 0.5 |
| Characteristics |  |  |  |  |  |
| flexural strength (kg./cm.$^2$) | 1861 | 1891 | 1836 | 1836 | 1840 |
| flexural modulus (kg./cm.$^2$) | $16.1 \times 10^4$ | $15.6 \times 10^4$ | $15.4 \times 10^4$ | $15.1 \times 10^4$ | $15.0 \times 10^4$ |
| mold release resistance (kg.) | 247 | 247 | 248 | 250 | 247 |
| gas evolution in injection molding | none | none | none | none | none |
| electric resistance (mΩ) | 11 | 6 | 10 | 7 | 6 |

TABLE 2

|  | Ex. 12 | Ex. 13 | Ex. 14 |
|---|---|---|---|
| Composition | A | A | A |
| liquid-crystal polyester resin (parts by weight) | 100 | 100 | 100 |
| potassium titanate fiber (parts by weight) | 45 | 45 | 45 |
| pentaerythritol tetrastearate (parts by weight) | 0.1 | 0.5 | 2.0 |
| Characteristics |  |  |  |
| flexural strength (kg./cm.$^2$) | 2220 | 2190 | 2170 |
| flexural modulus (kg./cm.$^2$) | $15.5 \times 10^4$ | $15.1 \times 10^4$ | $14.7 \times 10^4$ |
| mold release resistance (kg.) | 194 | 192 | 183 |

TABLE 2-continued

|  | Ex. 12 | Ex. 13 | Ex. 14 |
|---|---|---|---|
| gas evolution in injection molding | none | none | none |
| electric resistance (mΩ) | 9 | 8 | 10 |

TABLE 3

|  | Ex. 15 | Ex. 16 | Ex. 17 |
|---|---|---|---|
| Composition | A | A | A |
| liquid-crystal polyester resin (parts by weight) | 100 | 100 | 100 |
| potassium titanate fiber (parts by weight) | 45 | 45 | 45 |
| pentaerythritol tetrastearate (parts by weight) | 0.1 | 0.5 | 2.0 |
| Characteristics |  |  |  |
| flexural strength (kg./cm.$^2$) | 2550 | 2520 | 2510 |
| flexural modulus (kg./cm.$^2$) | $12.0 \times 10^4$ | $11.9 \times 10^4$ | $11.9 \times 10^4$ |
| mold release resistance (kg.) | 192 | 191 | 186 |
| gas evolution in injection molding | none | none | none |
| electric resistance (mΩ) | 10 | 9 | 12 |

TABLE 4

|  | Comp. Ex. 1 | Comp. Ex. 2 | Comp. Ex. 3 | Comp. Ex. 4 | Comp. Ex. 5 |
|---|---|---|---|---|---|
| Composition (parts by weight) | A | B | B | B | B |
| liquid-crystal polyester resin | 100 | 100 | 100 | 100 | 100 |
| glass fiber | 60 | 60 | 60 | 60 | 60 |
| milled glass fiber | 40 | 40 | 40 | 40 | 40 |
| parting agent |  |  |  |  |  |
| ethylenebisstearamide | 0 | 0 | 0.5 | 0 | 0 |
| zinc stearate | 0 | 0 | 0 | 0.5 | 0 |
| glycol tristearate | 0 | 0 | 0 | 0 | 0.5 |
| Characteristics |  |  |  |  |  |
| flexural strength (kg./cm.$^2$) | 1881 | 1875 | 1816 | 1837 | 1814 |
| flexural modulus (kg./cm.$^2$) | $15.9 \times 10^4$ | $15.7 \times 10^4$ | $15.3 \times 10^4$ | $15.1 \times 10^4$ | $15.0 \times 10^4$ |
| mold release resistance (kg.) | 651 | 650 | 351 | 351 | 351 |

TABLE 4-continued

|  | Comp. Ex. 1 | Comp. Ex. 2 | Comp. Ex. 3 | Comp. Ex. 4 | Comp. Ex. 5 |
|---|---|---|---|---|---|
| gas evolution in injection molding | none | none | observed | observed | observed |
| electric resistance (mΩ) | 8 | 6 | 810 | 530 | 430 |

TABLE 5

|  | Comp. Ex. 6 | Comp. Ex. 7 |
|---|---|---|
| Composition (parts by weight) | A | A |
| liquid-crystal polyester resin | 100 | 100 |
| potassium titanate fiber | 45 | 45 |
| parting agent |  |  |
| ethylenebisstearamide | 0 | 0.5 |
| Characteristics |  |  |
| flexural strength (kg./cm.$^2$) | 2331 | 2124 |
| flexural modulus (kg./cm.$^2$) | 14.7 × 10$^4$ | 14.1 × 10$^4$ |
| mold release resistance (kg.) | 576 | 293 |
| gas evolution in injection molding | none | observed |
| electric resistance (mΩ) | 9 | 295 |

TABLE 6

|  | Comp. Ex. 8 | Comp. Ex. 9 | Comp. Ex. 10 |
|---|---|---|---|
| Composition (parts by weight) |  |  |  |
| polyphenylene sulfide (parts by weight) | 100 | 0 | 0 |
| polyether sulfone resin (parts by weight) | 0 | 100 | 0 |
| polyether ether ketone resin (parts by weight) | 0 | 0 | 100 |
| glass fiber (parts by weight) | 45 | 45 | 45 |
| pentaerythritol tetrastearate (parts by weight) | 0.5 | 0.5 | 0.5 |
| Characteristics |  |  |  |
| flexural strength (kg./cm.$^2$) | 2500 | 1900 | 2380 |
| flexural modulus (kg./cm.$^2$) | 13.0 × 10$^4$ | 8.14 × 10$^4$ | 10.5 × 10$^4$ |
| mold release resistance (kg.) | 50 | 245 | 271 |
| gas evolution in injection molding | none | none | none |
| electric resistance (mΩ) | 439 | 540 | 804 |

TABLE 7

|  | Ex. 18 | Ex. 19 | Ex. 20 | Ex. 21 | Ex. 22 | Ex. 23 | Ex. 24 | Ex. 25 | Ex. 26 |
|---|---|---|---|---|---|---|---|---|---|
| Composition (parts by weight) | A | B | C | D | E | F | G | H | I |
| liquid-crystal polyester resin | 100 | 100 | 100 | 100 | 100 | 100 | 100 | 100 | 100 |
| glass fiber | 60 | 60 | 60 | 60 | 60 | 60 | 60 | 60 | 60 |
| milled glass fiber | 40 | 40 | 40 | 40 | 40 | 40 | 40 | 40 | 40 |
| pentaerythritol tetramontanate | 0.5 | 0.5 | 0.5 | 0.5 | 0.5 | 0.5 | 0.5 | 0.5 | 0.5 |
| Characteristics |  |  |  |  |  |  |  |  |  |
| flexural strength (kg./cm.$^2$) | 1911 | 1879 | 1847 | 1857 | 1892 | 1834 | 1834 | 1842 | 1438 |
| flexural modulus (kg./cm.$^2$) | 15.2 × 10$^4$ | 15.1 × 10$^4$ | 15.2 × 10$^4$ | 16.1 × 10$^4$ | 15.5 × 10$^4$ | 15.1 × 10$^4$ | 15.1 × 10$^4$ | 15.4 × 10$^4$ | 14.8 × 10$^4$ |
| mold release resistance (kg.) | 247 | 251 | 244 | 245 | 251 | 248 | 255 | 248 | 248 |
| gas evolution in injection molding | none | none | none | none | none | none | none | none | none |
| electric resistance (mΩ) | 10 | 15 | 13 | 16 | 11 | 8 | 16 | 7 | 11 |

TABLE 8

|  | Ex. 27 | Ex. 28 | Ex. 29 |
|---|---|---|---|
| Composition (parts by weight) | A | A | A |
| liquid-crystal polyester resin | 100 | 100 | 100 |
| potassium titanate fiber | 45 | 45 | 45 |
| pentaerythritol tetramontanate | 0.1 | 0.5 | 2.0 |
| Characteristics |  |  |  |
| Flexural strength (kg./cm.$^2$) | 2224 | 2188 | 2168 |
| flexural modulus (kg./cm.$^2$) | 15.2 × 10$^4$ | 14.8 × 10$^4$ | 14.5 × 10$^4$ |
| mold release resistance (kg.) | 199 | 196 | 186 |
| gas evolution in injection molding | none | none | none |
| electric resistance (mΩ) | 11 | 11 | 12 |

TABLE 9

|  | Ex. 30 | Ex. 31 | Ex. 32 | Ex. 33 |
|---|---|---|---|---|
| Composition (parts by weight) | I | I | I | I |
| liquid-crystal polyester resin | 100 | 100 | 100 | 100 |
| glass fiber | 45 | 45 | 45 | 45 |
| pentaerythritol tetranontanate | 0.1 | 0.5 | 2.0 | 0 |
| pentaerythritol tetrastearate | 0 | 0 | 0 | 0.2 |
| Characteristics |  |  |  |  |
| flexural strength (kg./cm.$^2$) | 1662 | 1649 | 1637 | 1642 |
| flexural modulus (kg./cm.$^2$) | 11.2 × 10$^4$ | 10.9 × 10$^4$ | 10.6 × 10$^4$ | 10.7 × 10$^4$ |
| mold release resistance (kg.) | 201 | 195 | 192 | 191 |
| gas evolution in injection molding | none | none | none | none |

TABLE 9-continued

| | Ex. 30 | Ex. 31 | Ex. 32 | Ex. 33 |
|---|---|---|---|---|
| electric resistance (mΩ) | 11 | 11 | 12 | 8 |

TABLE 10

| | Comp. Ex. 12 | Comp. Ex. 13 | Comp. Ex. 14 | Comp. Ex. 15 |
|---|---|---|---|---|
| Composition (parts by weight) | A | B | I | A |
| liquid-crystal polyester resin | 100 | 100 | 100 | 100 |
| glass fiber | 60 | 60 | 45 | 0 |
| milled glass fiber | 40 | 40 | 0 | 0 |
| potassium titanate fiber | 0 | 0 | 0 | 45 |
| pentaerythritol tetramontanate | 0 | 0 | 0 | 0 |
| Characteristics | | | | |
| flexural strength (kg./cm.$^2$) | 1881 | 1875 | 1677 | 2257 |
| flexural modulus (kg./cm.$^2$) | $15.9 \times 10^4$ | $15.7 \times 10^4$ | $11.2 \times 10^4$ | $15.4 \times 10^4$ |
| mold release resistance (kg.) | 651 | 650 | 644 | 585 |
| gas evolution in injection molding | none | none | none | none |
| electric resistance (MΩ) | 8 | 6 | 10 | 9 |

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A liquid-crystal polyester resin composition consisting essentially of:

(a) 100 parts by weight of a liquid-crystal polyester resin comprising at least 80 mole percent of recurring aromatic ester units, and (b) 0.01 to 5 parts by weight, per 100 parts (a), of a fatty acid ester represented by the general formula:

$$X^3CH_2-\underset{\underset{CH_2X^4}{|}}{\overset{\overset{CH_2X^2}{|}}{C}}-CH_2X^1, \quad (1)$$

wherein at least one of $X^1$, $X^2$, $X^3$ and $X^4$ is $$-O-\overset{\overset{O}{\|}}{C}-R$$

group and the others when not $$-O-\overset{\overset{O}{\|}}{C}-R$$

are selected from the group consisting of —H, —OH, an alkyl group, and an aryl group, and R is an alkyl or alkenyl group having 2 to 30 carbon atoms.

2. A liquid-crystal polyester resin composition as set forth in claim 1, wherein the fatty acid ester is one represented by the general formula (1) wherein all of $X^1$, $X^2$, $X^3$ and $X^4$ are $$-O-\overset{\overset{O}{\|}}{C}-R$$

groups wherein R is as defined above.

3. A liquid-crystal polyester resin composition as set forth in claim 1, wherein the fatty acid ester is one represented by the general formula (1) wherein all of $X^1$, $X^2$ and $X^3$ are $$-O-\overset{\overset{O}{\|}}{C}-R$$

groups wherein R is as defined above and $X^4$ is selected from the group consisting of —H, —OH, an alkyl, and an aryl group.

4. A liquid-crystal polyester resin composition as set forth in claim 1, wherein at least one inorganic filler additionally is present therein in an amount of approximately 0.5 to 500 parts by weight per 100 parts by weight of the said liquid-crystal polyester resin.

5. A liquid-crystal polyester resin composition as set forth in claim 1, wherein at least one inorganic filler additionally is present therein in an amount of approximately 5 to 250 parts by weight per 100 parts by weight of said liquid-crystal polyester resin.

6. A liquid-crystal polyester resin composition as set forth in claim 1, wherein a fibrous filler is present therein in an amount of approximately 40 to 100 parts by weight per 100 parts by weight of said liquid-crystal polyester resin.

7. A liquid-crystal polyester resin composition as set forth in claim 1, wherein said liquid-crystal polyester comprises recurring naphthalene units.

8. A liquid-crystal polyester resin composition as set forth in claim 1, wherein said liquid-crystal polyester comprises recurring 4-oxybenzoyl moieties, and recurring 6-oxy-2-naphthoyl moieties.

9. A liquid-crystal polyester resin composition as set forth in claim 8, wherein said 4-oxybenzoyl moieties are present in a concentration of approximately 70 mole percent and said 6-oxy-2-naphthoyl moieties are present in a concentration of approximately 30 mole percent.

10. A liquid-crystal polyester composition as set forth in claim 1, wherein said fatty acid ester is present in a concentration of 0.1 to 2 parts by weight per 100 parts by weight of said liquid-crystal polyester resin.

11. A liquid-crystal polyester composition as set forth in claim 1, wherein said fatty acid ester is selected from the group consisting of pentaerythritol tristearate, pentaerythritol tetrastearate, pentaerythritol trioleate, pentaerythritol tetraoleate, and mixtures of thereof.

12. A liquid-crystal polyester composition as set forth in claim 1, wherein said fatty acid ester is pentaerythritol tristearate.

13. A liquid-crystal polyester composition as set forth in claim 1, wherein said fatty acid ester is pentaerythritol tetrastearate.

14. A liquid-crystal polyester composition as set forth in claim 1, wherein said fatty acid ester is pentaerythritol tetramontanate.

* * * * *